L. F. ADT.
EYEGLASS MOUNTING.
APPLICATION FILED DEC. 8, 1906.
1,004,954.
Patented Oct. 3, 1911.
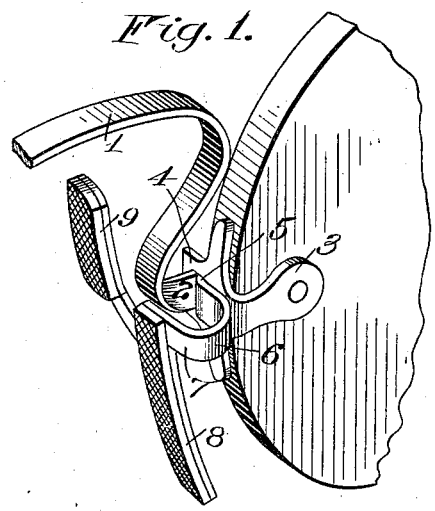
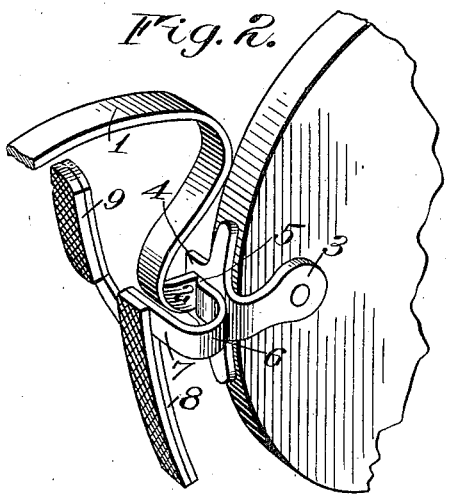
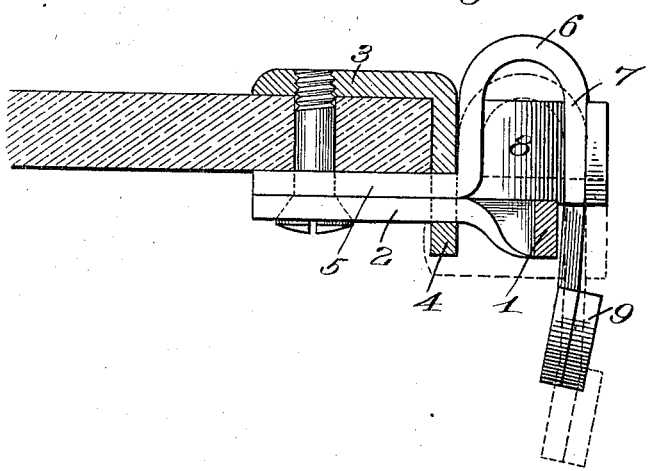

UNITED STATES PATENT OFFICE.

LEO F. ADT, OF ALBANY, NEW YORK.

EYEGLASS-MOUNTING.

1,004,954.   Specification of Letters Patent.   Patented Oct. 3, 1911.

Application filed December 8, 1906.   Serial No. 346,885.

*To all whom it may concern:*

Be it known that I, LEO F. ADT, of Albany, in the county of Albany and State of New York, have invented certain new and useful Improvements in Eyeglass-Mountings; and I do hereby declare the following to be a full, clear, and exact description of the same, reference being had to the accompanying drawings, forming a part of the specification, and to the reference-numerals marked thereon.

My present invention relates to improvements in eyeglasses and it has for its object to provide guard attaching portions having pliable loops or bends therein so formed and arranged relatively to the parts of the mounting as to afford a considerable range of adjustment for the guards in a direction forwardly and rearwardly of the plane of the lenses, as well as to permit adjustment of the guards to provide for different pupilary distances and to accommodate noses of different widths, the construction and arrangement of the parts in the present instance being such that the mounting can be made up in various styles and constructed very cheaply.

To these and other ends the invention consists in certain improvements, and combinations and arrangements of parts, all as will be hereinafter more fully described, the novel features being pointed out in the claims at the end of the specification.

In the drawings: Figure 1 is a perspective view of a portion of an eyeglass mounting, having a nose guard attached thereto in accordance with my present invention, the nose guard in this instance being set forward. Fig. 2 is a view similar to Fig. 1 showing the nose guard offset toward the rear, and Fig. 3 represents a central horizontal section through the attaching portions showing the relative arrangement of the bridge end and the adjustable loop or bend of one of the guards.

Similar reference numerals in the several figures indicate similar parts.

The present invention provides an improved manner of mounting the nose guards adapted to be adjusted or set by the optician so as to properly fit each individual nose, and when so adjusted they retain their relative adjustments, and in the present instance it consists in providing the nose guards with attaching arms, preferably of flat, pliable material each having a substantially U-shaped loop or bend arranged in substantially a horizontal plane, and having their arms extending forwardly and rearwardly between the inner ends of the lenses, one arm of the loop being attached to the lens or mounting at a point substantially in the plane of the rear surface of the lens, or substantially so, and extending forwardly therefrom and thence inwardly and finally rearwardly to form the loop, and the rearwardly-extending arm carrying the nose guard thereon, the adjustable loop thus formed opening toward the rear and lying practically forward of the rear surface of the lens.

My invention in the present instance is shown applied to eyeglasses of the rimless type, and the bridge and guards are attached to the lenses by means of attaching devices similar to those shown in my prior Patent No. 691,345, although of course it will be understood that the invention is not limited in these respects.

The bridge 1 in the present instance is of the vertically opening type having its end extending downwardly and thence extending outwardly beyond the inner edge of the lens to form an attaching arm 2, a clip 3 being fitted over the lens edge and having a strap 4 arranged to coöperate with the attaching arm of the bridge to hold it in coöperative relation with the lens; and secured between the latter and the attaching arm of the bridge, is the attaching arm 5 of the nose guard. This guard arm in the present instance extends to the inner edge of the clip; thence turns forwardly or in a direction transverse of the plane of the lenses, extending to a point at or in front of the forward surface of the lens when the guard occupies an intermediate or forward adjustment, the arm thence turning inwardly and finally extending rearwardly to form the horizontal adjustable bend 6, and the rearwardly-extending arm 7 of the bend thus formed is provided with a suitable nose guard. The nose guard may be attached to the supporting arm either as a separate part, or it may be formed integrally therewith, as may be desired, the latter means of attachment being employed in the present instance, and the particular form of guard shown embodying the downwardly-extending nose-bearing portion 8 having its upper end attached to the guard supporting arm 7, and having a rearwardly offset pad 9, but it will be understood of course that the invention is not limited in this respect, as guards of various forms may be used.

In fitting eyeglasses to noses of different shapes, it is usually necessary for the optician to adjust the guards in a direction forwardly or rearwardly of the plane of the lenses to insure the positioning of the lenses at the proper distance in front of the wearer's eyes, as well as to adjust the guards inwardly or outwardly to enable them to obtain a firm hold on noses of different widths, or to allow for variations in pupilary distances. A relative forward or rearward adjustment of the guards is obtained according to the present invention, by bending the loop in the guard supporting arm at different points, this operation being conveniently accomplished by means of the ordinary optician's pliers, it being obvious that by varying the location of this bend in the loop of the guard supporting arm in a direction transversely of the plane of the lenses, a corresponding adjustment of greater degree is given the nose guard, the full and dotted lines in Fig. 3 indicating the relative positions of the bend in the nose guards when the latter are in the forward and rear positions. These bends of the guard supporting arm are preferably open loops having their attached ends fixed to the lens or mounting at a point in, or in proximity to the plane of the rear surface of the lens so as to enable an extreme rearward adjustment of the guard, one method of attaching the parts to accomplish this result being shown in the present embodiment, and the attaching portion of the bridge is so arranged as to clear the guard supporting arm in order to enable ample adjustment of the loop or bend thereof, the bridge shown in the present embodiment having its ends leading downwardly to a point between the inner and outer arms of the loop, and as the latter are arranged between the inner edges of the lenses and are in substantially the plane of the lenses, these parts do not protrude unduly beyond the forward and rear lens surfaces, so that the mounting is compact and presents a neat appearance, and when the guards have been properly adjusted by the optician, they will retain their adjustments to insure a perfect fit on the wearer's nose. In the particular form of lens attaching device shown, the close proximity of the fixed arm of the adjustable loop may serve to hold the clip firmly in coöperative relation with the lens.

I claim as my invention:

1. In eyeglasses, the combination with the lenses, and a bridge spring connecting them, of nose guards having attaching arms composed of pliable material bent to form horizontal loops opening toward the rear of the mounting, each loop being adapted to be bent at different points to adjust the guard forward or rearward and having one arm proceeding from the mounting at a point in rear of the forward surface of the lenses to extend freely through the plane of the latter, and carrying the nose guard on its free end.

2. In eyeglasses, the combination with the lenses, and a suitable bridge connecting them, of nose guards and attaching arms for the guards composed of pliable material each having a horizontal adjustable loop formed therein arranged between the proximate edges of the lenses, and opening toward the rear of the mounting, one end of the loop being fixed to the mounting at a point at or in rear of the rear plane of the lens, the free end of the loop carrying the nose guard.

3. In eyeglasses, the combination with a lens, and a bridge having its end extending downwardly; thence outwardly to the lens, of a nose guard having an attaching portion composed of pliable material and provided with a horizontal loop arranged substantially in the plane of the lens, the arms of the loop being arranged on opposite sides of the vertical line of the downwardly-extending portion of the bridge, one arm being fixed to the mounting and the other arm carrying the nose guard.

4. In eyeglasses, the combination with a lens, of a bridge having an attaching portion extending outwardly beyond the inner edge of the lens, a nose guard having an attaching portion overlapping the rear surface of the lens between the latter and the attaching portion of the bridge, and provided with a horizontal loop opposite to the inner edge of the lens and opening toward tion with the lens and the free end of the loop being connected to said guard attaching portion, and the other end of the loop carrying the nose guard, and means for securing the bridge and guard attaching portions to the lens.

5. In eyeglasses, the combination with a lens, and a clip having a lens-edge bearing portion, a strap at one side and an attaching lug at the other side overlapping the lens, of a bridge having an attaching portion fitting beneath said strap and overlapping the lens edge opposite to the attaching lug of the clip, and a nose guard having an attaching portion fitting beneath the said strap between the attaching portion of the bridge and the lens and provided with a horizontal loop, a portion of the latter coöperating with the clip to hold it in coöperative relation with the lens and the free and of the loop carrying the nose guard, and means for securing said clip and the bridge and guard attaching portions to the lens.

6. In eyeglasses, the combination with a lens, of a nose guard having an outwardly extending attaching portion secured to the rear face of the lens and a horizontal loop opening toward the rear of the mounting; and a bridge having an attaching portion secured over the attaching portion of the guard.

LEO F. ADT.

Witnesses:
  EDWARD MURPHY, 2d,
  WILLIAM M. KEENAN.

Copies of this patent may be obtained for five cents each, by addressing the "Commissioner of Patents, Washington, D. C."